(12) United States Patent
Grant

(10) Patent No.: US 8,814,221 B2
(45) Date of Patent: Aug. 26, 2014

(54) FACILITATING ACCESS OF POLE-MOUNTED ITEMS

(75) Inventor: Andrew J Grant, Houston, TX (US)

(73) Assignee: Swivelpole Patent Pty Ltd., Mandurah (AU)

( * ) Notice: Subject to any disclaimer, the term of this patent is extended or adjusted under 35 U.S.C. 154(b) by 42 days.

(21) Appl. No.: 13/491,773

(22) Filed: Jun. 8, 2012

(65) Prior Publication Data

US 2013/0328302 A1    Dec. 12, 2013

(51) Int. Cl.
*F16L 27/00* (2006.01)
*H02G 11/00* (2006.01)
*H02G 1/00* (2006.01)

(52) U.S. Cl.
CPC . *H02G 11/00* (2013.01); *H02G 1/00* (2013.01)
USPC ......... 285/184; 265/278; 265/282; 265/153.1

(58) Field of Classification Search
USPC ......... 285/184, 185, 273, 278, 280, 281, 282; 403/84, 87, 91, 92, 93, 98; 239/587.5, 239/587.6
See application file for complete search history.

(56) References Cited

U.S. PATENT DOCUMENTS

| | | | | |
|---|---|---|---|---|
| 442,809 | A * | 12/1890 | Hunter | 285/282 |
| 783,987 | A * | 2/1905 | Walsh | 285/184 |
| 960,899 | A * | 6/1910 | Guyer | 285/184 |
| 1,020,839 | A * | 3/1912 | Niesen | 285/184 |
| 1,233,170 | A | 7/1917 | Berry | |
| 1,526,336 | A * | 2/1925 | Hart | 285/405 |
| 1,601,014 | A | 9/1926 | Wismer et al. | |
| 1,605,507 | A * | 11/1926 | Burke | 285/184 |
| 1,822,260 | A * | 9/1931 | Adams | 403/87 |
| 1,880,098 | A * | 9/1932 | Mair | 285/184 |
| 2,212,747 | A * | 8/1940 | O'Leary | 285/184 |
| 2,250,448 | A | 7/1941 | Edwards | |
| 2,342,120 | A * | 2/1944 | Cartwright | 239/587.5 |
| 2,447,947 | A * | 8/1948 | Larson et al. | 285/184 |
| 2,479,580 | A | 8/1949 | Marco | |
| 2,577,811 | A | 12/1951 | Rutledge | |
| 2,632,660 | A | 3/1953 | Krauthamer | |
| 2,729,473 | A * | 1/1956 | Warshawsky | 285/282 |
| 2,910,310 | A | 10/1959 | Mulac | |
| 3,355,847 | A | 12/1967 | Pratt | |

(Continued)

FOREIGN PATENT DOCUMENTS

| | | |
|---|---|---|
| DE | 2918532 A1 | 11/1980 |
| DE | 4210625 C1 | 10/1993 |
| FR | 2217625 B3 | 9/1974 |
| GB | 410600 | 5/1934 |

*Primary Examiner* — David E Bochna
(74) *Attorney, Agent, or Firm* — Baker Botts L.L.P.

(57) ABSTRACT

Apparatus for use in a pivoting pole assembly including a first component comprising an outside face adapted for connection with a support element, and a first inside face, and defining a first central wiring passage; and a second component defining a second central wiring passage, and comprising an outside face adapted for connection with the base end of the elongate object and an inside face rotationally coupled to the first inside face. The first central passage and the second central passage are fluidly connected and share a common axis of rotation, and the first component rotates with respect to the second component about a common axis of rotation. The apparatus also includes an annular locking mechanism including arcuate channels a radial distance from the axis; and protrusions extending into the channels such that upon respective rotation of components the protrusions travel along the channels.

19 Claims, 14 Drawing Sheets

(56) References Cited

U.S. PATENT DOCUMENTS

| | | |
|---|---|---|
| 3,737,179 A | 6/1973 | White |
| 3,778,610 A | 12/1973 | Wolf |
| 4,020,606 A | 5/1977 | Pratt |
| 4,090,210 A | 5/1978 | Wehling et al. |
| 4,592,177 A | 6/1986 | Pratt |
| 4,991,622 A | 2/1991 | Brewer et al. |
| 5,275,444 A | 1/1994 | Wythoff |
| 5,333,436 A | 8/1994 | Noble |
| 5,398,978 A * | 3/1995 | Gagnon ................. 285/184 |
| 5,624,198 A | 4/1997 | Fuchs |
| 5,687,537 A | 11/1997 | Noble |
| 5,772,172 A | 6/1998 | Sampedro et al. |
| 5,794,387 A | 8/1998 | Crookham |
| 5,813,706 A * | 9/1998 | Travis ................. 285/184 |
| 6,045,239 A | 4/2000 | Waldmann |
| 6,050,614 A | 4/2000 | Kirkpatrick |
| 6,070,996 A | 6/2000 | McCollum |
| 6,957,832 B1 | 10/2005 | Pannekoek |
| 7,690,822 B2 | 4/2010 | Kauffman |

\* cited by examiner

FIG. 5B
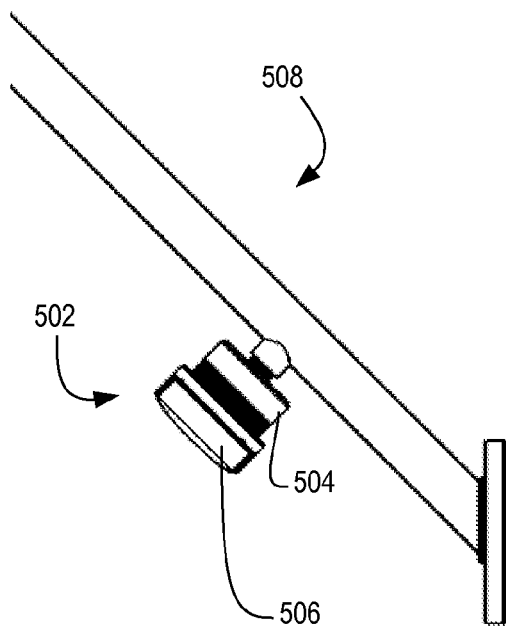
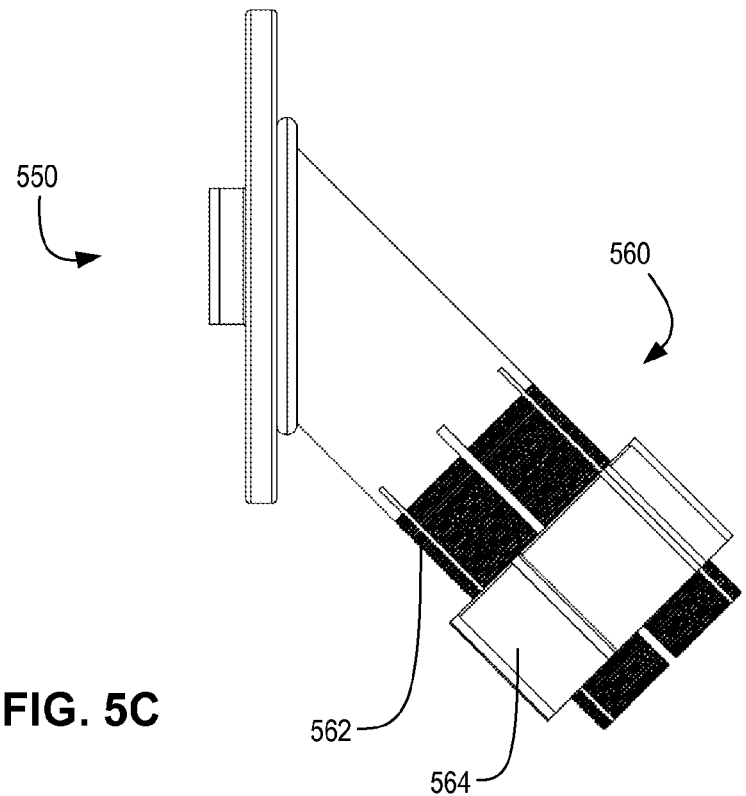
FIG. 5C

FACILITATING ACCESS OF POLE-MOUNTED ITEMS

BACKGROUND

Elongate objects such as poles, masts, shafts, posts, pillars, and towers have long been used to promote general illumination by attaching lighting to the object at an elevated position some distance from the supported end of the object (i.e., the base end) toward the remote end of the object. In some instances, the distance may be eight to ten feet or more. The preference for using lights elevated in this manner in industrial applications is well known. Benefits may include keeping the lighting out of the way of general traffic, providing for a wide dispersal of illumination while avoiding glare, avoiding damage to the lighting, and so on. Similarly mounting other items such as security cameras, sensors, loudspeakers, antennas, flags, and the like to an elongate object is also widely known.

Typically, access to these items is regularly required for repair, maintenance, configuration, and so on. Accessing items mounted as above has proven problematic, especially in industrial settings, such as chemical processing facilities, manufacturing plants, refineries, mining operations, and the like. Use of a ladder to access these items is generally unsafe in industrial environments. In many cases, the item is elevated from a suspended walkway, which is itself elevated from surrounding areas, thus exacerbating the perils of balancing on a ladder. In addition, the surrounding areas may also contain further obstacles.

As a result of the perils of ladder use in industrial settings, systems and methods have been developed to lower the remote end of an elongate object opposite the base (e.g., the top end of a light pole). Recently, lowering the remote end has been accomplished by rotating an upper section of the object downward through the use of a rotational joint, or pivot joint, incorporated between the end of the object connected to the base and the remote end, or between two elongate objects. The system including the pivot joint and the coupled upper and lower sections of the elongate object may be called a pivoting pole assembly. Some known systems also have a passage interior to the elongate object extending from the base end, through the joint, to the remote end, and wiring (wires, cables, etc.) running through the passage to the mounted item to provide power, communications, and so on.

SUMMARY

The combination of an elongate object, an item mounted to the object, and wiring may be referred to as a wired pole assembly. Prior art pivot joints are adapted to connect a base end of an elongate object of a wired pole assembly to a support and facilitate access to items mounted remote from the base end, while allowing passage of wiring therethrough.

Generally, aspects of the present invention provide for accurately, reliably, easily, safely and/or rapidly raising and lowering elongate objects as part of a pivoting pole assembly; and allow the assembly to be precisely toggled between one or more operational orientations and access orientations.

A first general embodiment is an apparatus for use in a pivoting pole assembly, including a wired pole assembly. The apparatus may allow for manipulating an object to facilitate access to a mounted item. The apparatus may be or incorporate a pivot joint. The apparatus comprises a first component comprising a first outside face, the first outside face adapted for connection with at least one of a support element and the base end of the elongate object, and a first inside face, and defining a first central wiring passage; and a second component defining a second central wiring passage, and comprising a second outside face, the second outside face adapted for connection with at least the other of a support element and the base end of the elongate object, and a second inside face rotationally coupled to the first inside face such that: the first central passage and the second central passage are fluidly connected and share a common axis of rotation; and the first component rotates with respect to the second component about the common axis of rotation. Either or both central wiring passages may be substantially toroid. The apparatus also includes an annular locking mechanism comprising one or more arcuate channels, defined by the second component, the channels located a radial distance from the common axis of rotation and extending from the respective inside face to the respective outside face of the second component, each channel comprising a first channel end and a second channel end; and one or more protrusions extending from the first component and extending into the one or more channels such that upon rotation of the second component with respect to the first component, the protrusions and the channels rotate with respect to one another such that the location of each of the protrusions travels along the channel, and a range of relative rotation of the second component with respect to the first component is defined by the length of the channels.

The apparatus may further be configured such that, upon connection of a base end of an elongate object and a support element, respectively, to opposing faces chosen from the first outside face and the second outside face: the elongate object is pivotable through a range of motion corresponding to the arcuate channels such that the remote end of the elongate object may be raised or lowered through rotation of the first component; and rotation of the first component and the second component with respect to one another comprises a range of possible rotation defined by the one or more first channel ends and the one or more second channel ends.

In some embodiments, the apparatus may be configured for an elongate object of a particular length attached to at least one of the first outside face and the second outside face of the apparatus at a particular angle such that upon the installation of the pivoting pole assembly with the base end of the elongate object and the support element being connected to the respective opposing faces, and the item being mounted at a particular location on the elongate object: upon at least one protrusion abutting at least one first channel end, the elongate object is aligned in an optimal operational orientation; and upon at least one protrusion abutting at least one second channel end, the elongate object is aligned in an optimal target orientation providing access to an item mounted on the elongate object at an optimum access elevation.

The first component and/or the second component may substantially comprise a toroid. The first component and the second component may comprise interlocking flange plates. The locking mechanism may hold the first component immobile with respect to the second component. One or more of the protrusions may be implemented as a bolt threadedly engaged with the first component. The bolt may be threadedly tightenable into the first component to bias the first component and the second component together.

Either of the outside faces may include a perimeter and an annular mating surface between the central wiring passage and the perimeter. The mating surface may be adapted for connection with a rim of a tubular object, such as, for example, by welding. Alternatively, the mating surface may include a tubular adaptor in fluid connection with the first central wiring passage, the tubular adapter configured to receive an elongate object.

The apparatus may include a hub extending through the plane of rotation from the inside face of at least one of the first component and the second component and substantially to the plane defined by the outside face of the other of the first component and the second component.

The apparatus may include a collar extending through the plane of rotation from the inside face of at least one of the first component and the second component and substantially to the plane defined by the outside face of the other of the first component and the second component, and encircling the perimeter of the other of the first component and the second component.

One general embodiment includes an apparatus adapted to connect a base end of an elongate object to a support and facilitate access to articles mounted remote from the base end. In some instances, the support may be a lower section of the elongate object. In some embodiments, the apparatus is pivot joint. Other general embodiments include a rotational pole assembly (e.g., pivoting pole assembly) comprising an upper object section and lower object section functionally connected by a pivot joint as described above. Structurally, the rotational pole assembly may include an upper pole assembly rotationally coupled to a lower pole assembly.

One general embodiment includes an apparatus for use in a pivoting pole assembly including a first component comprising a first outside face, the first outside face adapted for connection with at least one of a support element and the base end of the elongate object, and a first inside face, and defining a first central wiring passage; and a second component defining a second central wiring passage, and comprising a second outside face, the second outside face adapted for connection with at least the other of a support element and the base end of the elongate object, and a second inside face rotationally coupled to the first inside face such that the first central passage and the second central passage are fluidly connected and share a common axis of rotation. The first component may rotate with respect to the second component about the common axis of rotation.

At least one of the first outside face and the second outside face may comprise a perimeter and a tubular mating surface radially located between the perimeter and the outermost of the first central wiring passage and the second central wiring passage. The tubular mating surface may comprise a tubular adaptor in fluid connection with at least one of the first central wiring passage and the second central wiring passage. The tubular adapter may be configured to receive an elongate object. The apparatus may further include a junction box module in fluid connection with the tubular adaptor.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The following figures are part of the present specification, included to demonstrate certain aspects of embodiments of the present disclosure and referenced in the detailed description herein. Unless otherwise noted, figures are not drawn to scale.

FIG. 5B illustrates an upper pole assembly incorporating a junction box module.

FIGS. 5C-5E illustrate a conversion pivot joint component according to embodiments of the invention.

DETAILED DESCRIPTION

The principles of the invention are explained by describing in detail, specific example embodiments of devices, systems, and methods for facilitating access to an item mounted on an elongate object (such as, for example, a pole, mast, shaft, post, pillar, tower, or the like). The item could be, for example, a light fixture, remote camera, loudspeaker, or any other item. In some aspects, facilitating access is carried out by manipulating pivoting pole assemblies between one or more operational orientations and one or more access orientations.

General embodiments of the invention include pivoting pole assemblies and devices for incorporation within a pivoting pole assembly. Generally, embodiments of the invention may include pivot joints, connection apparatus, pivoting pole assemblies, pivoting pole sub-assemblies, and methods for their operation or construction. Connection apparatus may be adapted to connect a base end of an elongate object of a pivoting pole assembly to a support (e.g., a second elongate object, railing, a mounting fixture, a stanchion, etc.) and facilitate access to items mounted remote from the base end. More specific example embodiments are described below.

The pivoting pole assembly may be a wired pole assembly. A wired pole assembly may include wiring or cabling operatively coupled with the mounted item. The elongate object in a wired pole assembly may include an internal passage for running wiring or cabling to the mounted item. In some embodiments, an apparatus may connect the wired pole assembly to a support.

Figures 1A, 1B:
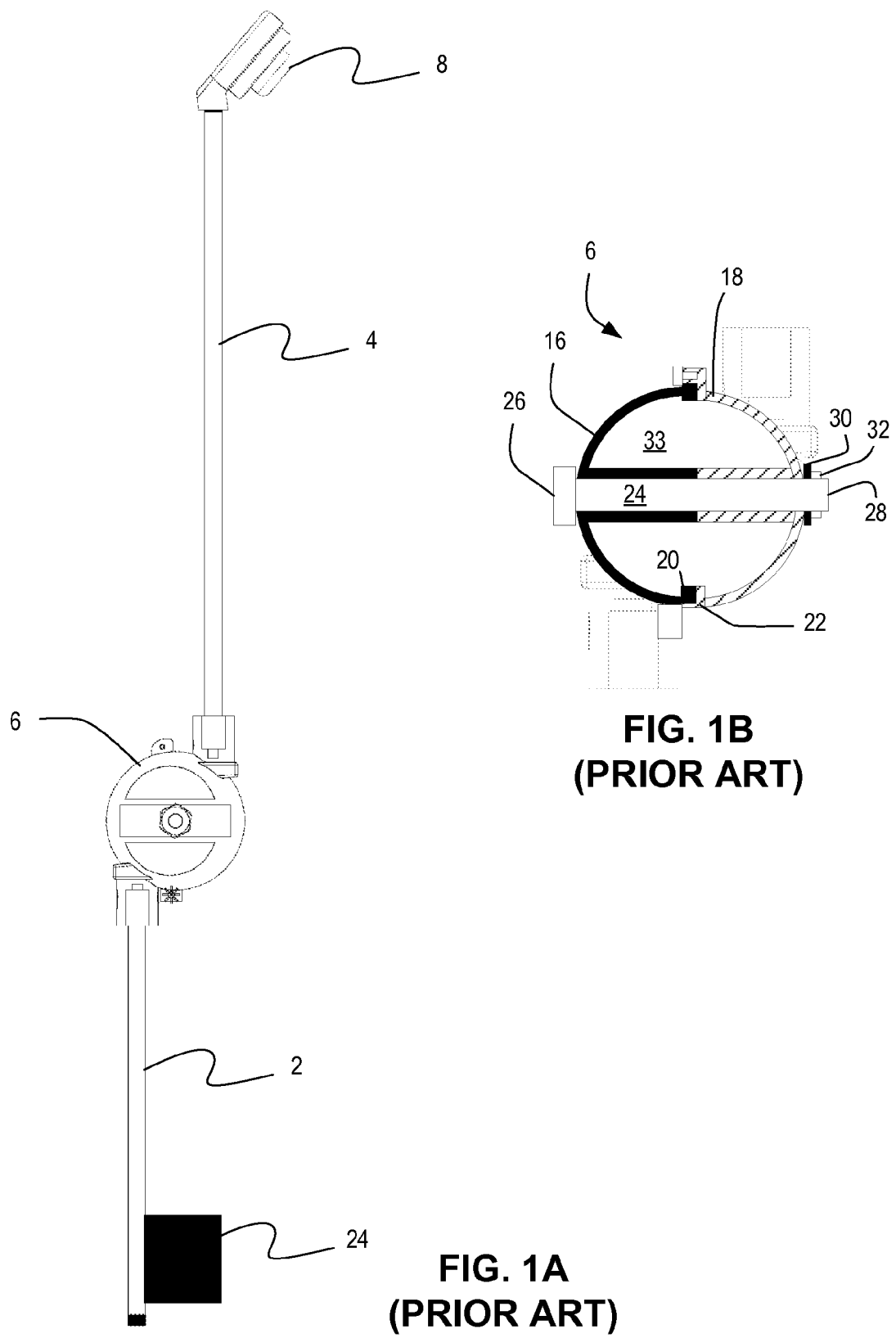
FIGS. 1A and 1B illustrate perspective views of a particular prior art rotational pole and pivot joint.

Pivoting pole assemblies are known in the art. FIGS. 1A and 1B illustrate perspective views of a particular prior art rotational pole and pivot joint, respectively. Referring to FIG. 1A, the prior art rotational pole includes a lower conduit 2, an upper conduit 4, a pivot joint 6, a light fixture 8, and a junction box 10. The pole may be mounted to a rail or attached to a base (not shown). Electrical wiring (not shown) runs within conduits 2, 4 from the base end of the pole 12 through pivot joint 6 to the remote end 14 and is connected to light fixture 8. Upper conduit 4 is pivoted down for maintenance.

Referring to FIG. 1B, the prior art pivot joint 6 includes a lower cup 16 and an upper cup 18. Together, the lower cup 16 and upper cup 18 define a substantially spherical wiring chamber. The circular edges of the cups end in flanges 20, 22 that meet in sliding rotational contact defining a swivel plane. The flanges 20, 22 may include a lip so that one cup is partially nested in the other. The cups 16, 18 are held together by a central locking bolt 24, which passes approximately through the diameter of the spherical wiring chamber 33 formed by the cups. The bolt 24 includes a head 26 retained in a recess of the lower cup 16 and a threaded end 28 (opposite the head) protruding through the upper cup 18, and held in place by a washer 30 and a nut 32 providing a compressive force against the outside of upper cup 18. Pivot joint 6 may also include a rubber stop block, mechanical stops and/or an indexing pin (not shown). Stop block and the mechanical stop can be radially spaced ninety degrees (90°), one hundred eighty degrees (180°), or any other desired angle, with respect to each other. Moreover, removable stops can be provided to lock the lower and upper cups 14, 16 in a vertical orientation. When the removable stops are removed, as the upper cup is rotated about the locking bolt with respect to the lower cup, the stop block makes contact with the mechanical stop at the desired angle and will prevent further rotation. An indexing pin can be inserted through aligned holes formed in the lower and upper cup flanges to temporarily lock the cups with respect to each other.

General embodiments of the present invention include pivoting pole assemblies and apparatus for use in a pivoting pole assembly. The apparatus may include a pivot joint, either exclusively or in combination with other components. Pivot joints of the present disclosure are advantageous over prior art pivot joints in ways that will become apparent from more particular descriptions of exemplary embodiments of the invention to follow.

In some embodiments of the disclosure, a pivot joint may allow for manipulation of an installed elongate object having an item mounted at a remote end. Manipulation may be carried out (i) to place the object in an orientation for improved or optimal access to the remote end or to the item mounted thereto; or (ii) to place the object in its optimal operational orientation.

Some aspects of the present invention may allow toggling between optimal orientations more easily, safely and/or rapidly; and may allow the assembly to be precisely toggled between one or more operational orientations and access orientations.

Example embodiments were chosen and described in order to best explain the principles of the invention and their practical application, and to enable others of ordinary skill in the art to understand the invention for various embodiments with various modifications as are suited to the particular use contemplated. Those skilled in the art will understand, however, that the invention may be embodied as many other devices, systems, and methods. For example, various aspects of the methods and devices may be combined in various ways or with various products, including existing products. Many modifications and variations will be apparent to those of ordinary skill in the art. The scope of the invention is not intended to be limited by the details of example embodiments described herein. The scope of the invention should be determined through study of the appended claims.

Specific design details have been provided for illustration, but should not be considered limiting. Readers of skill in the art will recognize that many variations of pivot joints and pivoting pole assemblies may be implemented consistent with the scope of the invention as described by the appended claims.

Some embodiments of the present disclosure may include a pivot joint constructed from a plurality of components. The pivot joint may comprise a first component and a second component rotationally coupled to one another so that the second component rotates with respect to the first component about a common axis of rotation.

Figure 2A:
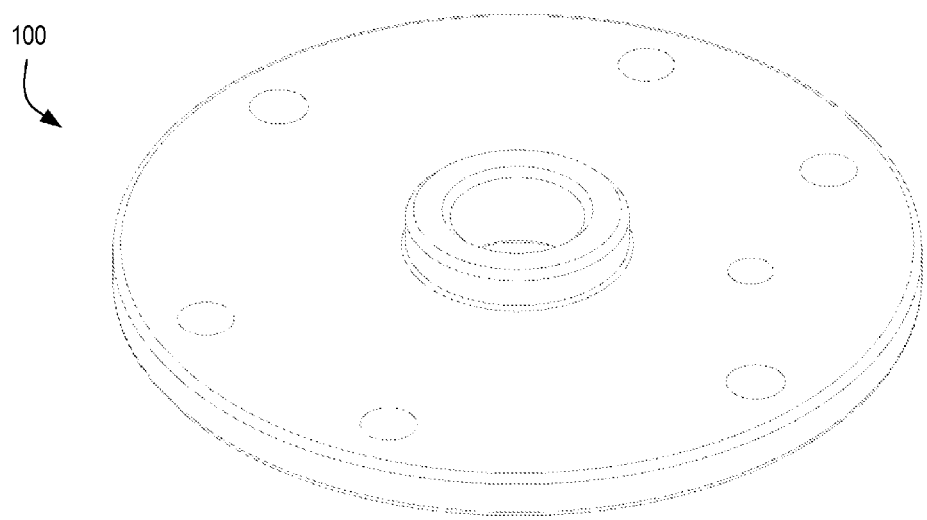
FIGS. 2A-2H illustrate components of an example pivot joint in accordance with embodiments of the invention.
Figure 2B:
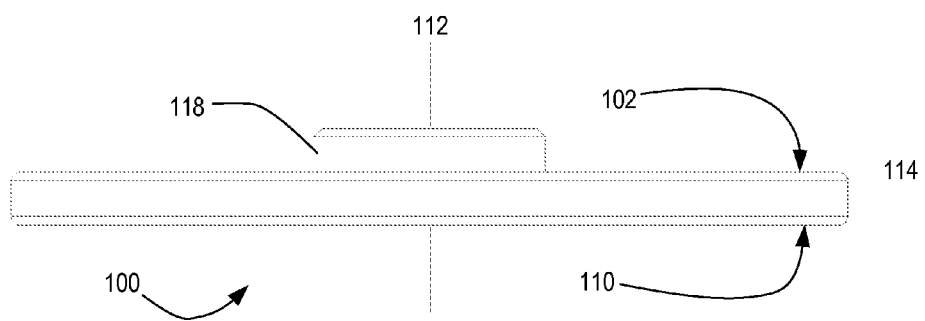
Figure 2C:
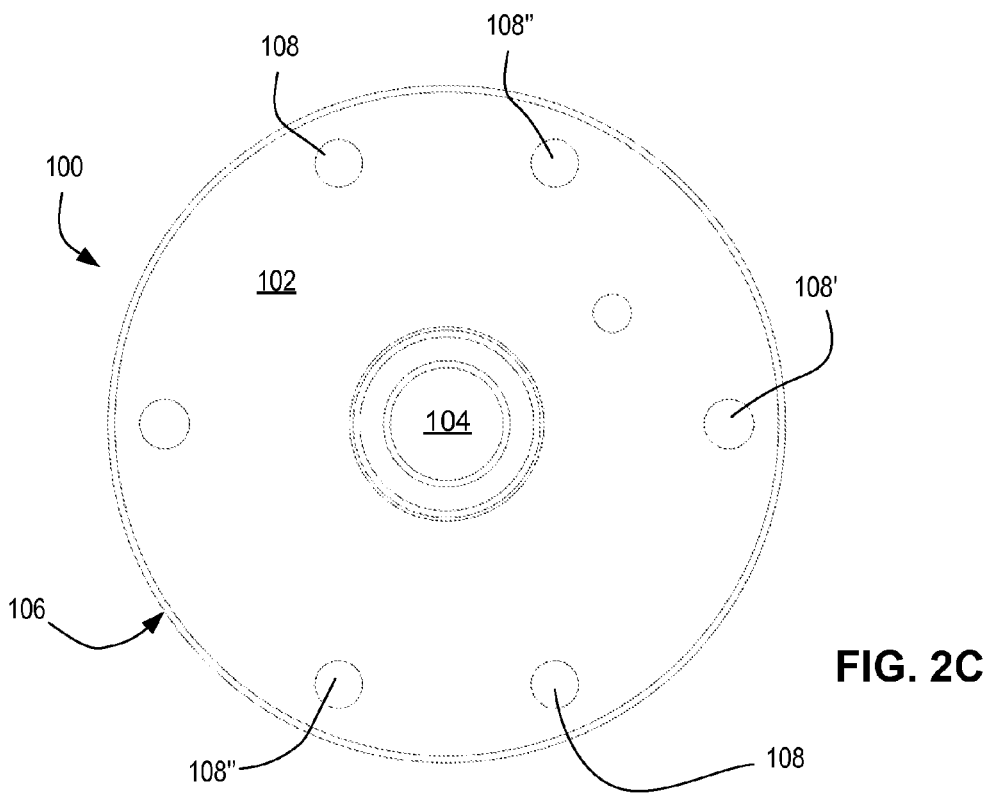
Figure 2D:
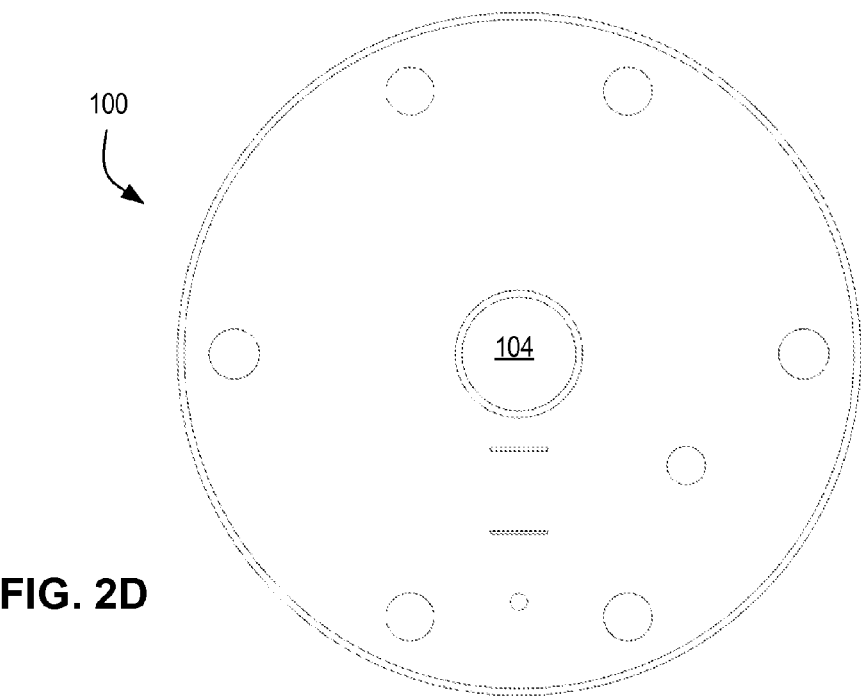

FIGS. 2A-2H illustrate components of an example pivot joint in accordance with embodiments of the invention. FIG. 2A illustrates a perspective view of a first pivot joint component in accordance with embodiments of the invention. FIG. 2B illustrates a profile view of the same component. FIG. 2C illustrates an inside face view of the same component. FIG. 2D illustrates an outside face view of the same component.

Figure 2E:
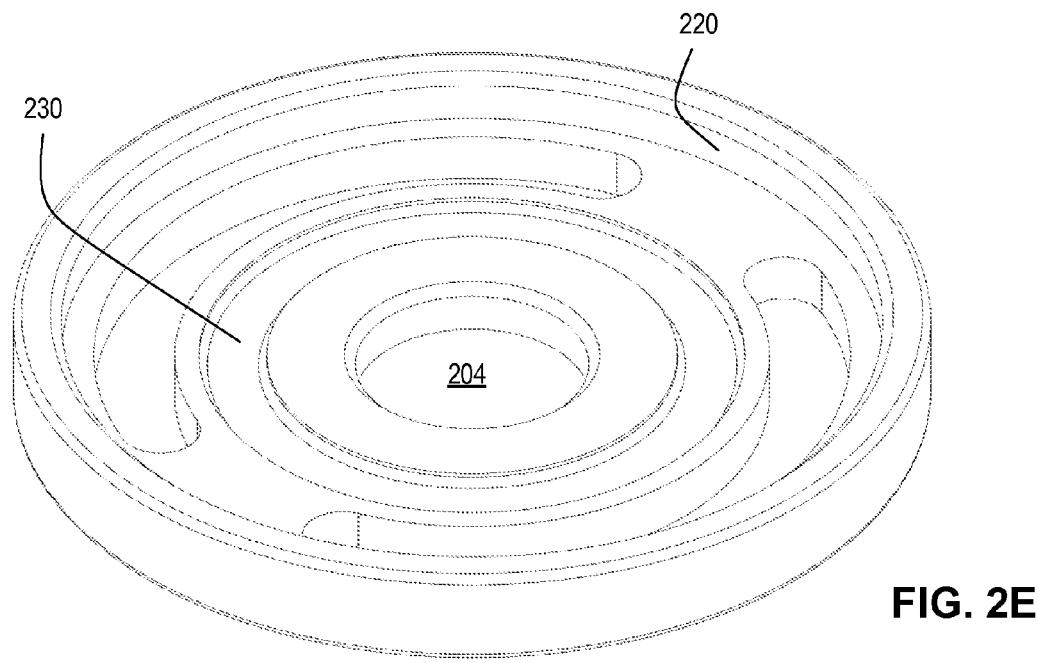
Figure 2G:
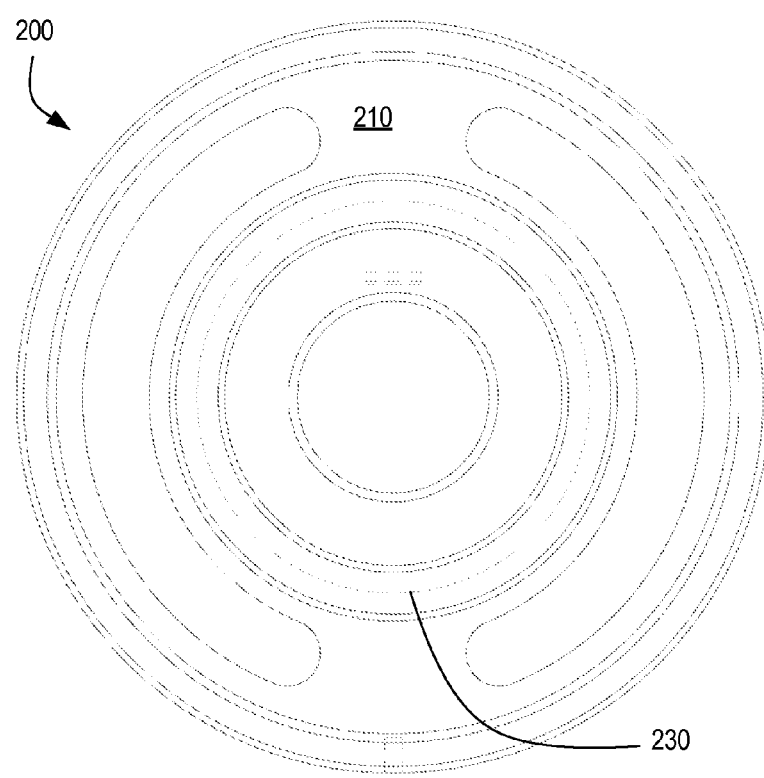
Figure 2F:
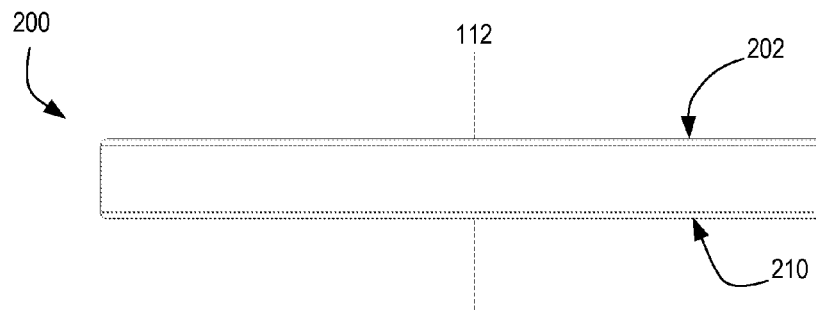
Figure 2H:
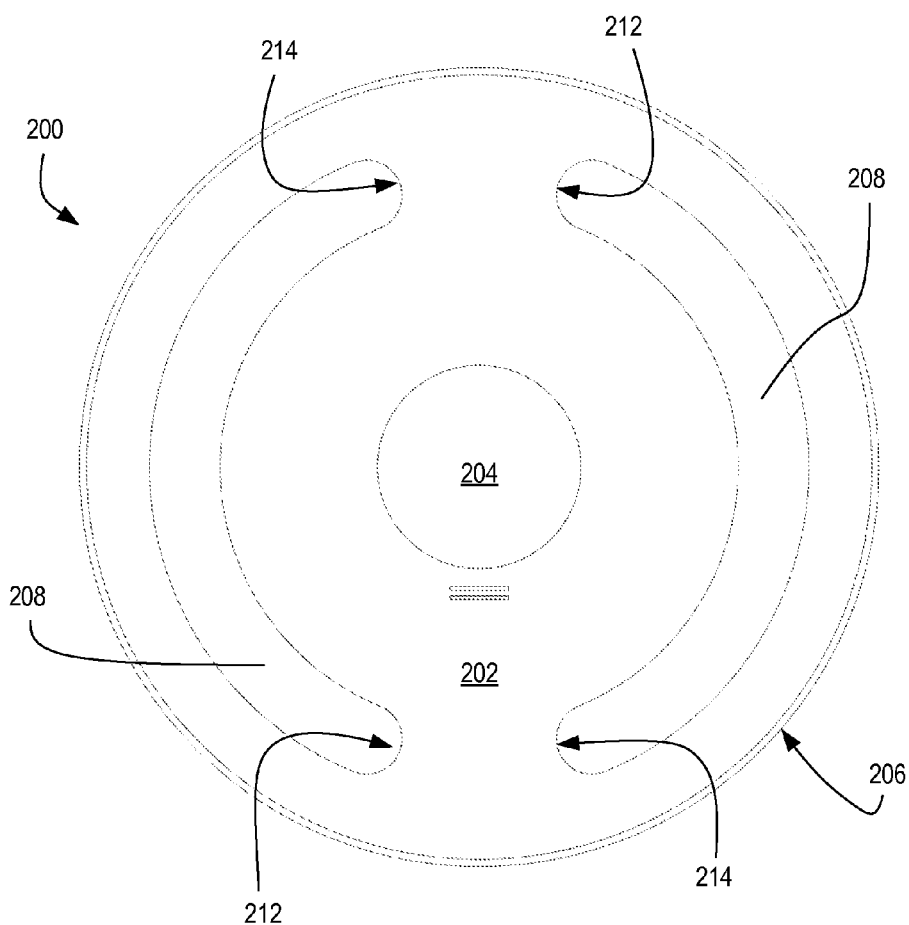

FIG. 2E illustrates a perspective view of a second example pivot joint component in accordance with embodiments of the invention. FIG. 2F illustrates a profile view of the same component. FIG. 2G illustrates an inside face view of the same component. FIG. 2H illustrates an outside face view of the same component.

The first component 100 has a first inside face 102 and a first outside face 110. The first outside face is adapted for connection with at least one of (i) a support element and (ii) a base end of an elongate object. The body of the first component 100 defines a first substantially toroid central wiring passage 104 and a perimeter 106. The first component 100 also includes receiving holes 108 (e.g., threaded bolt holes) configured to receive and engage one or more protrusions (e.g., threaded bolts).

The second component 200 has a second outside face 210 and a second inside face 202. The second outside face is adapted for connection with at least one of (i) a support element and (ii) a base end of an elongate object (whichever is not connected with the first outside face 110 of first component 100). The body of the second component 200 defines a second substantially toroid central wiring passage 204, a perimeter 206, and one or more arcuate channels 208 corresponding to receiving holes 108. The channels 208 are located a radial distance from the common axis of rotation 112 and extend from the inside face 202 to the outside face 210 of the second component 200. Each channel 208 includes a first channel end 212 and a second channel end 214.

In some implementations, outside faces 110 and 210 may each be specifically adapted to connect to only one of (i) a support element or (ii) a base end, so that outside face 110 is adapted to connect to one and outside face 210 is adapted to connect to the other. In other implementations, the base end and the support element may be similar at their respective points of connection with the pivot joint components, such that outside faces 110 and 210 are adapted for connection with either one of (i) a support element or (ii) a base end, so that each face is configured to accept connection with both types of object (support element and base end). Some outside faces may be adapted for connection with several object types or sizes, such as, for example, poles of various shapes and diameters.

The first component 100 and second component 200 may be rotationally coupled to one another to form a pivot joint. For example, first component 100 and second component 200 may be joined so that inside faces 102 and 202 meet and toroid central wiring passages 104, 204 are aligned to share a common axis 112. The first component 100 and second component 200 may be attached to assemble the pivot joint by inserting threaded bolts (not shown) through channels 208 and engaging the bolts in at least two opposing threaded bolt holes 108. A rotational surface of each of the inside faces is defined where the components meet in the process of rotating. The rotational surfaces contact in a rotational plane 114 and rotate about the common axis 112, which is perpendicular to the rotational plane 114.

Figure 3A:
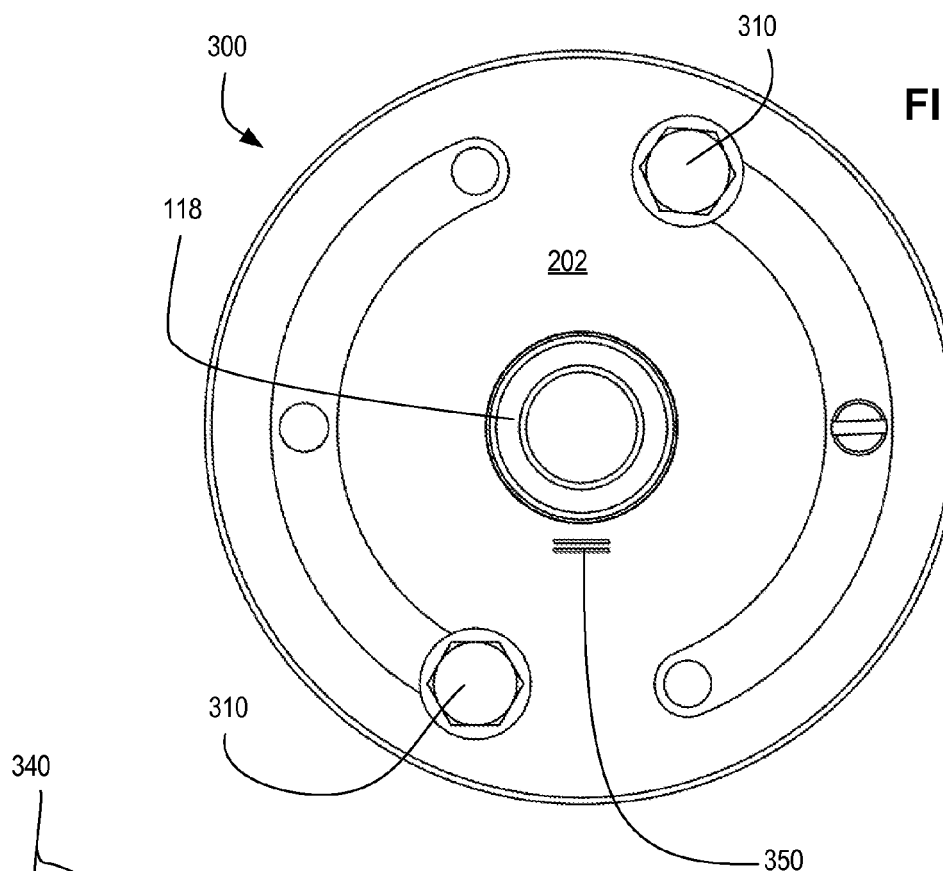
FIGS. 3A-3C illustrate an example assembled pivot joint in accordance with embodiments of the invention.
Figure 3C:
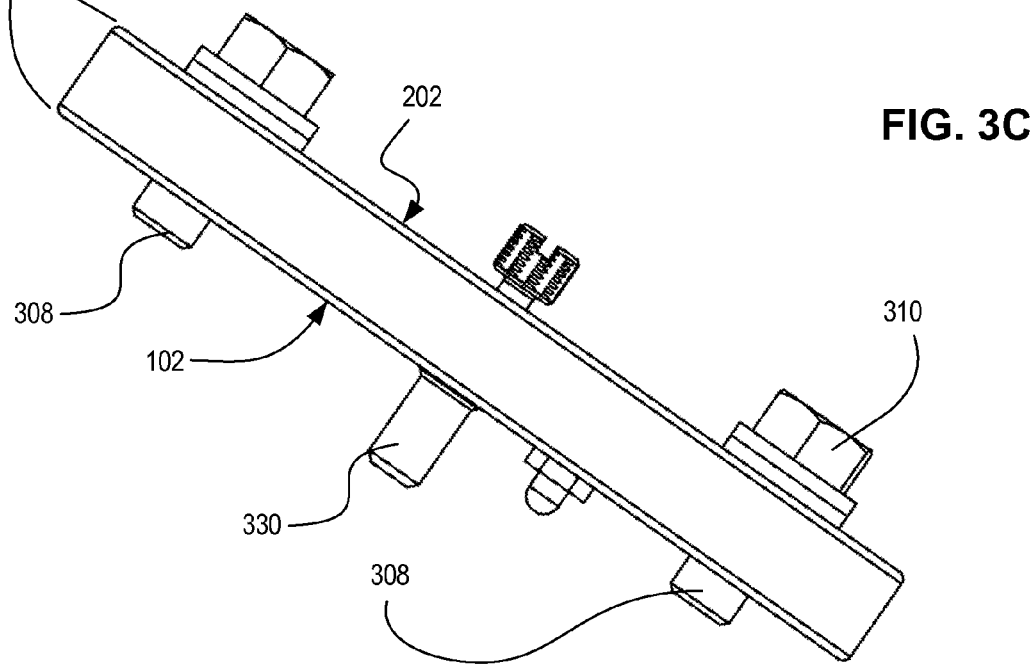
Figure 3B:
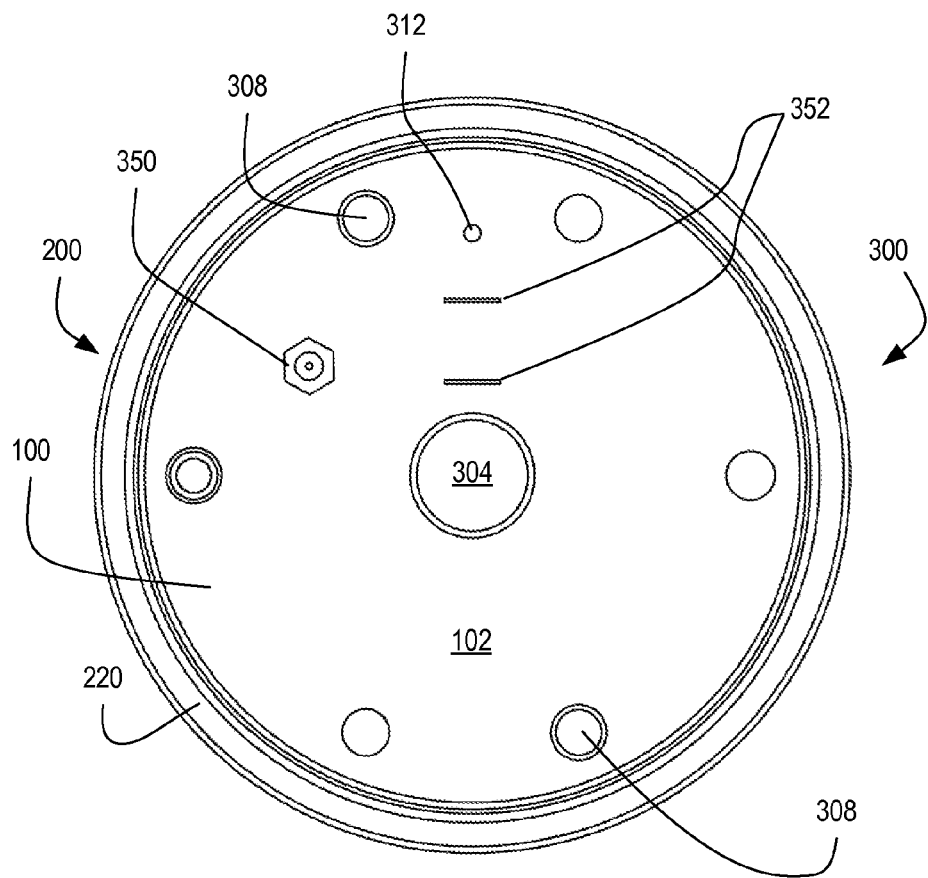

FIGS. 3A-3C illustrate an example assembled pivot joint in accordance with embodiments of the invention. FIG. 3A illustrates a profile view of a first pivot joint component in accordance with embodiments of the invention. FIG. 3B illustrates a reverse view of the same pivot joint. FIG. 3C illustrates a side view of the same pivot joint.

Pivot joint 300 is formed from an interlocking first component 100 and a second component 200, each comprising a flange plate. Outside faces 102, 202 of the flange plates become outside faces of the pivot joint 300. Pivot joint wiring passage 304 is formed from first wiring passage 104, which is encircled by hub 118. Hub 118 extends from the first component 100 through the rotational plane, and abuts and overlaps with wiring passage 204, which encircles hub 118. Hub 118 may extend from the first component through the rotational plane to the plane defined by the second outside face 210 of the second component 200, or substantially to the plane defined by the second outside face 210 (e.g., extending 90 percent, 95 percent, or more of the distance between the planes).

Collar 220 extends from the second component 200 through the rotational plane, and abuts and overlaps with perimeter 106, which collar 220 encircles. Collar 220 may extend from the second component 200 through the rotational plane to the plane defined by the first outside face 110 of the first component 100, or substantially to the plane defined by the first outside face 110 (e.g., extending 90 percent, 95 percent, or more of the distance between the planes). In some implementations, the hub and collar may extend past the respective outside faces to define the depth of the joint along the axis of rotation (joint depth 340, FIG. 3C).

Pivot joint 300 includes one or more protrusions 308 attached to first component 100 and extending from the first component 100 through the channels 208 of the second component 200 such that upon rotation of the second component with respect to the first component, the protrusions 308 travel along the channels 208, or more accurately for implementations wherein the second component 200 is part of an upper pole assembly, the channels 208 travel around the protrusions 308. These protrusions 308 may be threaded bolts 310, pins, studs or any other protrusion cooperating with channels 208 to guide the relative rotation of the two components.

Protrusions 308 may be adapted for engagement with the first component 100 (e.g., bolts), or may be manufactured integral to the first component 100 (e.g., studs). That is, the first component 100 and protrusions 308 may be formed from the same continuous piece of material. For example, the first component 100 and protrusions 308 may be cast or molded in one mold. Alternatively, the first component 100 and protrusions 308 may be machined or otherwise cut as one continuous piece from the same block or sheet of plastic or metal. Other parts may also be formed integrally with the first component 100 or second component 200.

In the pivot joint 300 of FIGS. 3A-3C, an annular locking mechanism is formed from threaded bolt holes 108, arcuate channels 208, and threaded bolts 310. Threaded bolts 310 may be inserted through channels 208 and engaged with threaded bolt holes 108 to rotationally couple the first component 100 and second component 200 to form the assembled pivot joint 300. Threaded bolt holes 108 avoid the use of a nut to tighten the locking mechanism, which prevents loose nuts from becoming dangerous falling projectiles. The bolts 310 may also be captive bolts to prevent them from becoming falling projectiles.

Threaded bolts 310 may be tightened sufficiently to provide sufficient friction between the rotational surfaces on the inside faces of the flange plates (e.g., first component 100 and second component 200) to prevent rotation. Upon installation of a pivoting pole assembly including pivot joint 300 (discussed in further detail below with reference to FIGS. 4A-4B), each of the outside faces 102, 202 is connected with an elongate object of the pivoting pole assembly. To provide for re-orienting the elongate object for repair, maintenance, and the like, the bolts may be loosened sufficiently to allow rotation.

This annular locking mechanism may provide a more uniform application of pressure over a larger rotational surface, thereby producing a configuration more reliably resistant to rotation. The locking mechanism is sufficient to prevent rotation due to the weight of the pole and may be sufficient to prevent rotation due to additional forces applied to the pole assembly (e.g., glancing blows from other objects at the worksite, a worker hanging or pulling, strong winds, etc.). The annular locking mechanism may also allow the center of the pivot joint to remain open so that wiring may be run more efficiently through objects coupled to the pivot joint 300. The arrangement of bolt holes 108, arcuate channels 208, and protrusions 308 also provides an orienting alignment function, discussed in further detail with respect to FIGS. 4A-B below.

Pivot joint 300 may provide for increased structural integrity for supporting the load of the elongate object to be attached for installation of the pivoting pole assembly. Whereas pivot joints found in previous rotational poles feature either hollow designs or designs where the load is supported by a single central cylinder, in pivot joint 300 the load is distributed to a reinforced central hub 118 (also shown in FIG. 2B) encircling pivot joint wiring passage 304 and a collar 220 (also shown in FIG. 2E). By distributing the load to multiple points across the inside face of the joint, pivot joint 300 provides increased structural strength and smoother rotation to a pivoting pole assembly, resulting in greater control of movement. Although the central hub 118 is shown as integral with component 100, and collar 220 is shown as integral with component 200, in alternative embodiments, the hub, collar, or both may be integral with either first component 100 or second component 200, or may be later attached to either component. Some pivot joints according to the present disclosure may include multiple collars, additional hubs, rings, or spokes, struts, and so on. In some embodiments, either or both of reinforced central hub 118 and collar 220 extend through the rotational plane, providing further structural strength.

Pivot joint 300 may provide for increased structural integrity with respect to preventing ingress of moisture and the resulting break down of lubrication in the joint. These problems may lead to excessive friction, which may cause increased wear and a higher likelihood of dangerous non-uniform (i.e., start-stop) motion when rotating the joint.

Outside faces 102, 202 of pivot joint 300 include a first annular mating surface 320 and second annular mating surface 322, respectively. First annular mating surface 320 lies between the first central wiring passage 102 and the first perimeter 106. The first annular mating surface 320 may lie radially between the first central wiring passage 102 and protrusions 308. Second annular mating surface 322 lies between the second central wiring passage 202 and the second perimeter 206. The second annular mating surface 322 may lie radially between the second central wiring passage 202 and channels 208. Annular mating surfaces 320, 322 may be delineated through etching or other surface markings 350, 352.

The mating surfaces are adapted for connection with a rim of a tubular object. Mating surfaces 320, 322 may be adapted for a welded connection. Mating surfaces 320, 322 may be sufficient for allowing a welded connection of a tubular elongate object so that at an outside face of the pivot joint 300, the object encircles pivot joint wiring passage 304, allowing wiring to run through the wiring passage 304 and an interior passage of the elongate object (not shown) to a mounted item. In other implementations, the mating surface comprises a raised connectable surface, as in the conversion kit disclosed below with respect to FIG. 5B.

Pivot joint 300 further comprises a lubrication system. The lubrication system comprises a lubrication port 312 for receiving the lubrication. The lubrication port is in fluid connection with a lubrication channel 230 (FIG. 2E) which distributes lubrication around the rotational surfaces of pivot joint 300. The lubrication system allows distribution of lubrication to the pivot joint without loosening or removing components of the joint.

Figure 4A:
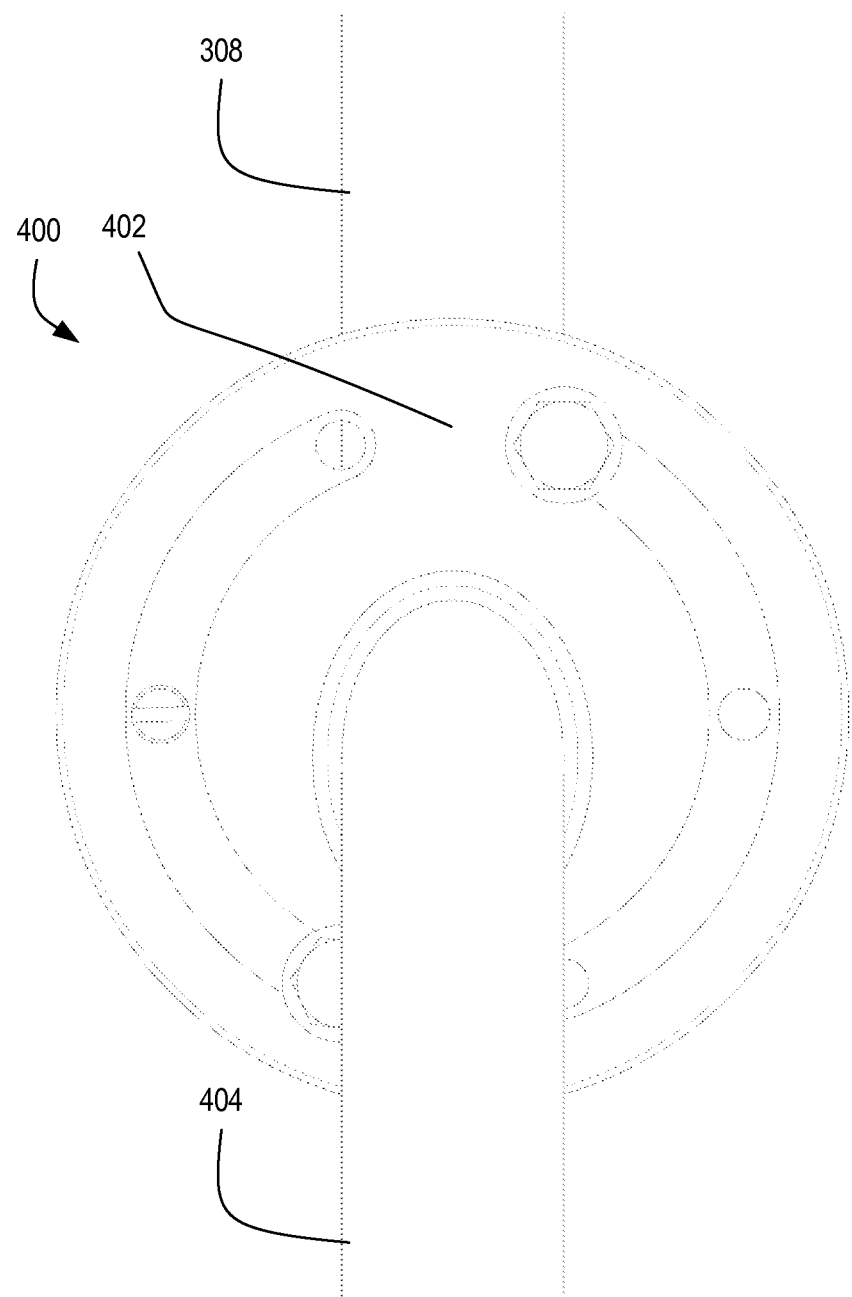
FIGS. 4A-4C illustrate an example pivoting pole assembly in accordance with embodiments of the invention.
Figure 4B:
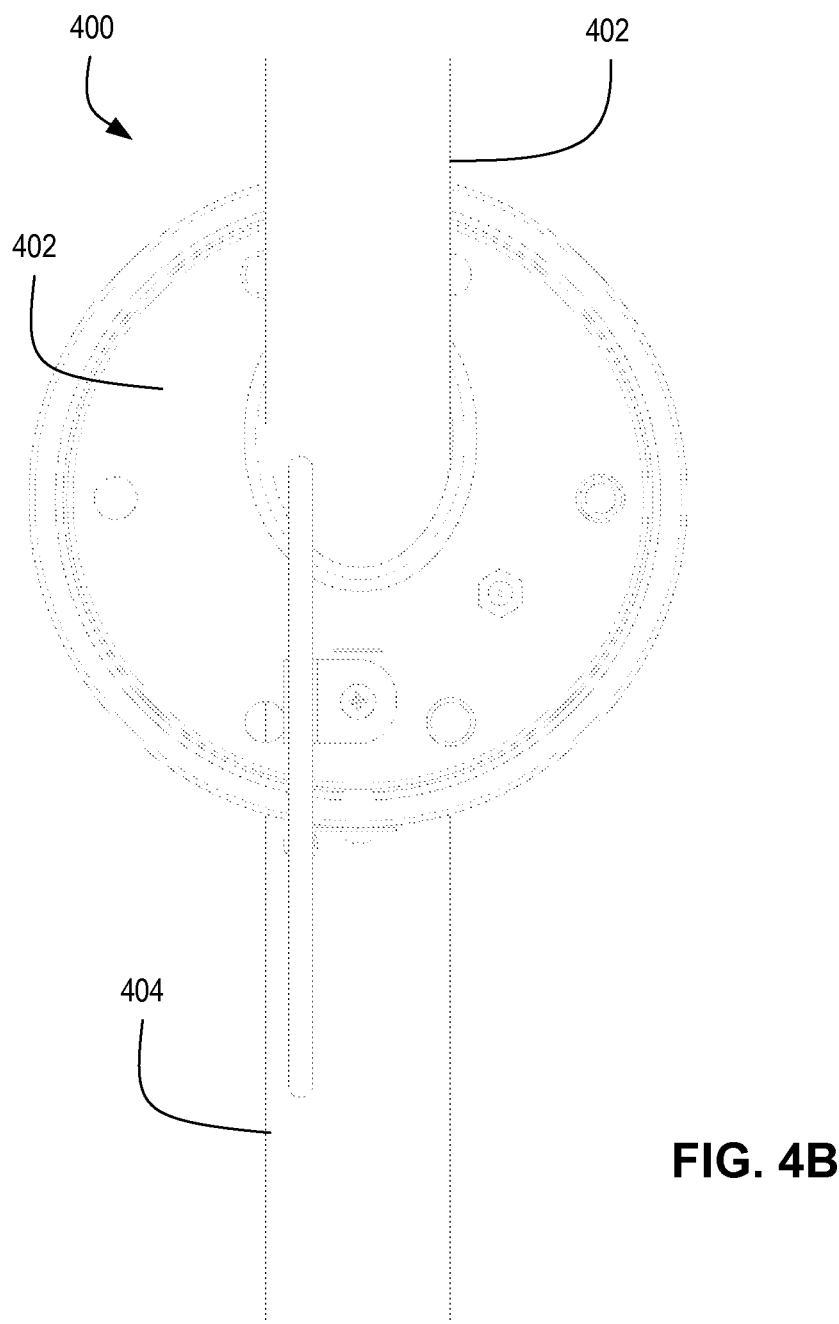

Further embodiments of the present disclosure include pivoting pole assemblies incorporating a pivot joint as described above. FIGS. 4A-4B illustrate an example pivoting pole assembly in accordance with embodiments of the invention. FIG. 4A illustrates a profile view of a first pivoting pole assembly in accordance with embodiments of the invention. FIG. 4B illustrates a reverse view of the same pivoting pole assembly.

Pivoting pole assembly 400 comprises a pivot joint 402 implemented according to embodiments of the invention, such as, for example, pivot joint 300, pivot joints utilizing pivot joint component 550, or any other pivot joint encompassed by the present invention. Pivot joint 402 pivotally connects a lower object section 404 and an upper object section 406 to form pivoting pole assembly 400. Lower object section 404 and upper object section 406 may be elongate objects, such as, for example, poles, shafts, towers, and the like. Lower object section 404 and upper object section 406 may be cylindrical or square tubular members made from aluminum, stainless steel, galvanized steel, or other durable material.

Structurally, the rotational pole assembly may include an upper pole assembly rotationally coupled to a lower pole assembly. The lower pole assembly may include a first component 100 welded or otherwise connected to lower object section 404. The upper pole assembly may include a second component 200 welded or otherwise connected to upper object section 406.

Pivot joint 402 is shown having second component 200 connected to the upper object section 406 at an angle (e.g., 35 degrees, 45 degrees, etc.) and the first component 100 connected to the lower object section 404 at a complementary angle (e.g., 55 degrees, 45 degrees, etc.), so that, as a result, the upper object section 406 and lower object section 404 are both 90 degrees from horizontal. The upper object section 406 and lower object section 404 may be aligned with one another or offset. Other implementations may be configured so that one or both of upper object section 406 and lower object section 404 are not perfectly vertically oriented (i.e., aligned at an angle other than 90 degrees from horizontal). In some implementations, this may be reversed so that second component 200 faces downward and is connected to lower object section 404 and first component 100 is connected to upper object section 406.

Pivot joint 402 includes one or more protrusions 308 (as described above) attached to a first component 100 and extending from the first component 100 through channels 208 of the second component 200 such that upon rotation of the second component with respect to the first component, the protrusions 308 travel along the channels 208, or more accurately, the channels 208 travel around the protrusions 308.

Figure 4C:
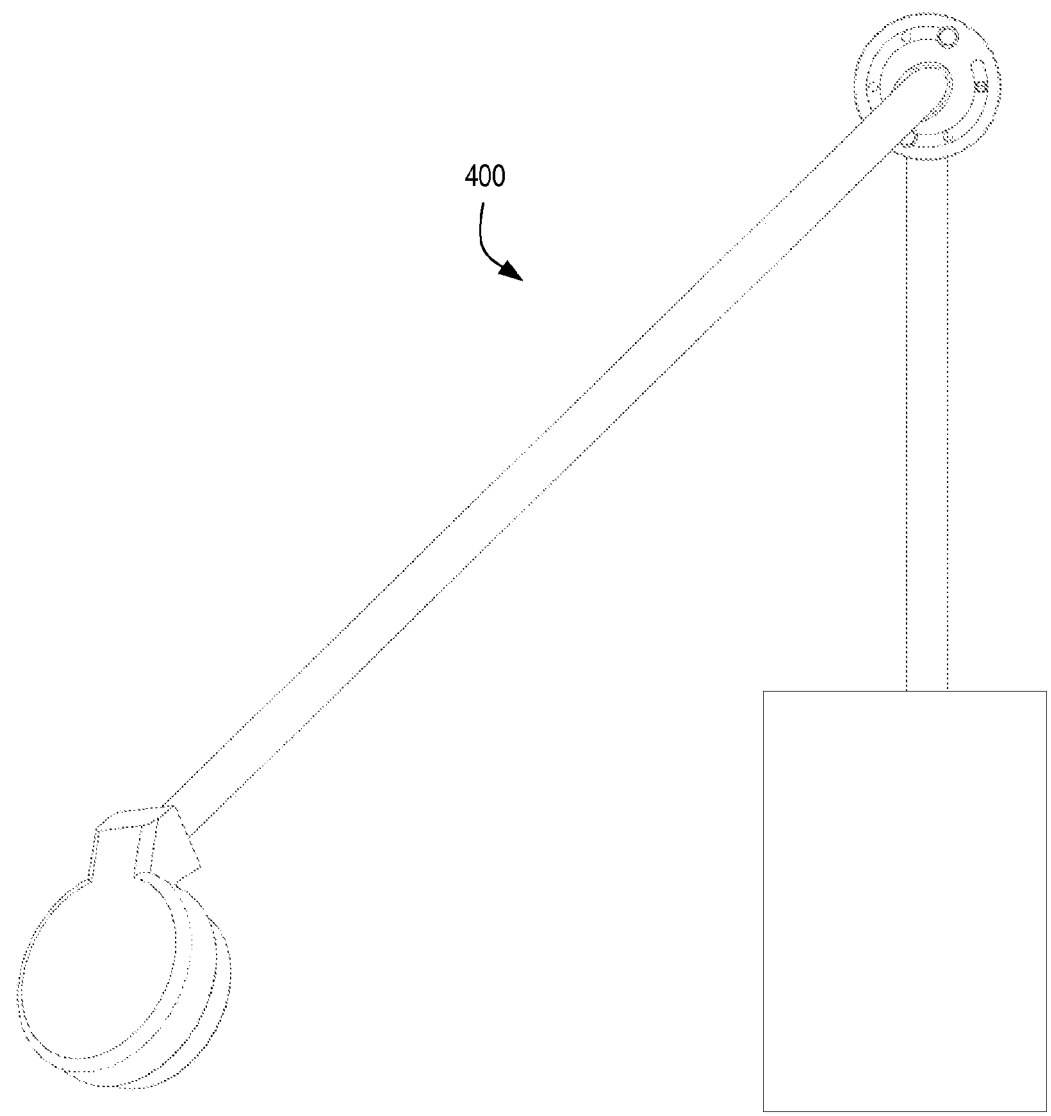

Protrusions 308 may be threaded bolts 310 tightenable to provide sufficient friction to prevent rotation of the second component 200 of the pivot joint 402 and along with it upper object section 406. Pivoting pole assembly 400 may be used as part of a wired pole assembly, such as a light pole. FIG. 4C illustrates an example pivoting pole assembly in an access orientation in accordance with embodiments of the invention. To provide for re-orienting the elongate object to access mounted items for repair, maintenance, and the like, the bolts may be loosened sufficiently to allow rotation when desired.

Because upper object section 406 is attached to the pivot joint 402 at the base end 408, the change in orientation of the upper object section 406 caused by the rotation of the pivot joint 402 and upper object section 406 causes the remote end 410 of the upper object section 406 to be raised or lowered. As a result, the upper pole section may be oriented to place the item at a lower elevation that better facilitates access to the item when access is required (FIG. 4C), and then re-oriented to restore the item to a higher elevation for daily operation (FIGS. 4A-4B).

As discussed briefly above, the arrangement of receiving holes 108, arcuate channels 208, and protrusions 308 also provides an orienting alignment function. The design and placement of the protrusions and arcuate channels on the pivot joint 402 may dictate the range of motion of the upper object section 406, and thus the range of motion of any mounted items. The range of rotation of the protrusions 308 with respect to arcuate channels 208 corresponds to the range of rotation of the upper object section 406. This range of rotation comprises a range of possible rotation defined by the one or more first channel ends 212 and the one or more second channel ends 214. Thus, when pivot joint 402 and upper object section are installed in a specific predetermined orientation, the channel ends 212, 214 represent hard stops at predetermined orientations for the upper object section 406. Therefore, with the dimensions of the upper object section, the location of any mounted items on the upper object section, and the installation orientation and installation height (height above walkway or other predominant surface) of the pivot joint taken into account, the channel ends 212, 214 represent hard stops at predetermined elevations for mounted items. Thus, the first channel end 212 prevents overshoot when lifting the upper object section 406 into an operational orientation, which may provide simpler, easier, safer, and/or more precise operation.

The elongate object is pivotable through a range of motion corresponding to the arcuate channels. Pivot joint 402 is configured in light of the dimensions of the attached upper object section 406, the mounted object location, and the installation orientation and installation height of the pivot joint; pivot joint 402 is configured to produce a predetermined elevation to optimize one or more maintenance or repair operations or a combination of maintenance and/or repair operations.

As a result, upon at least one protrusion 308 abutting at least one first channel end 212, the upper object section 406 is aligned in an optimal operational orientation; and upon at least one protrusion 308 abutting at least one second channel end 214, the upper object section 406 is aligned in an optimal target orientation providing access to the mounted item at an optimum access elevation. The configuration of the optimal target orientation may also prevent the item or the upper object section 406 from striking the ground or the walkway. In other implementations, the elevation of the remote end of upper object section 406 may be configured in place of the mounted item.

The optimal operational orientation may correspond to a perfect vertical orientation (i.e., 90 degrees from horizontal) for the upper object section 406, or just past a perfect vertical orientation so that minimal effort is required to be exerted by a user to maintain the upper object section 406 in position with the protrusion against the channel end 212 while the pivot joint 402 is tightened or otherwise locked in place. The optimal operational orientation may also correspond with the preferred or maximum height for a mounted item or for an item otherwise attached to the upper section.

The optimal target orientation may correspond to a horizontal orientation or a slightly above or below horizontal orientation. The optimal target orientation may be configured to provide access to the mounted item at an optimum access elevation. The optimum access elevation may include various elevations according to the item to be maintained or replaced, the schedule of maintenance or replacement, the operating environment, number of available workers, ergonomic or safety concerns, union rules, government or association regulations, local population preferences, and so on.

For example, in some implementations the pivot joint may be used to place a light pole section in a predetermined optimal access orientation for performing maintenance work on the mounted item (such as, for example, a light fixture). This optimal orientation may locate the light fixture at an elevation to facilitate maintenance, such as, for example, a height just above a walkway, an average waist height for personnel, an average chest height for personnel; a point somewhere between; or any other desired predetermined elevation to optimize one or more maintenance operations. After maintenance is concluded, disclosed embodiments allow personnel to return the light pole section to a predetermined optimal operational orientation (such as, for example, 90 degrees from horizontal) which may be the section's nominal orientation throughout its operational lifetime.

Some embodiments may implement a threaded alignment stop 330 as one of the protrusions 308. Secondary orientations may be available for selection using an optional threaded alignment stop 330 engaged with a secondary receiving hole 108'. These secondary orientations may result in secondary predetermined elevations to optimize one or more maintenance operations. For example, a first maintenance operation may correspond to the lowest elevation produced from the optimal access orientation (e.g., changing a light fixture at a level just above contact with the walkway), while a second maintenance operation may correspond to a slightly higher elevation produced from a secondary optimal access orientation (e.g., wiring for loudspeakers at waist level). A secondary receiving hole may also be used to provide orientations suitable for accessing the item despite the presence of obstacles. For example, a secondary orientation may be used when accessing a pole located on or near stairwells or equipment.

In some implementations, the threaded alignment stop may be used to further lock the pivot joint 300 from rotating. A secondary receiving hole 108" may be used to receive a secondary stop to lock the upper object section 406 in place at the ends of the range of rotation, or as a safety device to provide a minimum possible elevation until the stop is removed.

For example, a secondary threaded receiving hole 108' may be configured so that, upon at least one protrusion 308 abutting at least one first channel end 212 (optimal operational orientation), a secondary receiving hole 108' is aligned with a second channel end 214, so that upon engagement with the secondary receiving hole 108' the threaded alignment stop abuts or nearly abuts the second channel end 214, thereby preventing rotation away from the optimal operational orientation.

In operation, a worker or team of workers may rapidly, easily, safely, and/or accurately toggle the orientation of the upper pole section 406 between an optimal operational orientation and an optimal target orientation for access to the upper pole section 406 or the item. For example, a worker may move the upper pole section 406 from an optimal operational orientation to an optimal target orientation by simply placing nominal pressure against the upper pole section 406 towards the first channel end 212; loosening threaded bolts 310 to a rotational tightness; and then lowering the upper pole section 406 until it stops at the predetermined optimal target orientation. To restore the upper pole section 406 to the optimal operational orientation, the worker lifts the upper pole section until hitting the first channel end 212; and then tightens the threaded bolt 310.

To place the upper pole section 406 into a secondary optimal target orientation, a worker may engage the secondary stop into a desired secondary receiving hole 108'; place nominal pressure against the upper pole section 406 towards the first channel end 212; loosen threaded bolts 310 to a rotational tightness; and then lower the upper pole section 406 until it stops at the predetermined secondary optimal target orientation.

Construction and installation of a pivoting pole assembly may be carried out as separate operations or combined. Construction of the pivoting pole assembly may include cutting a desired length of tubular steel at a desired junction point to produce an upper section and a lower section. The cut is made at an angle, such as, for example, 45 degrees. Similar sections may be produced by cutting shorter lengths of steel tubing at complementary angles. The components of the pivot may then be welded or otherwise connected to the sections such that the resulting upper pole assembly and lower pole assembly may be assembled at the inside faces of the components so that the pivot joint rotationally couples the assemblies.

Figure 5A:
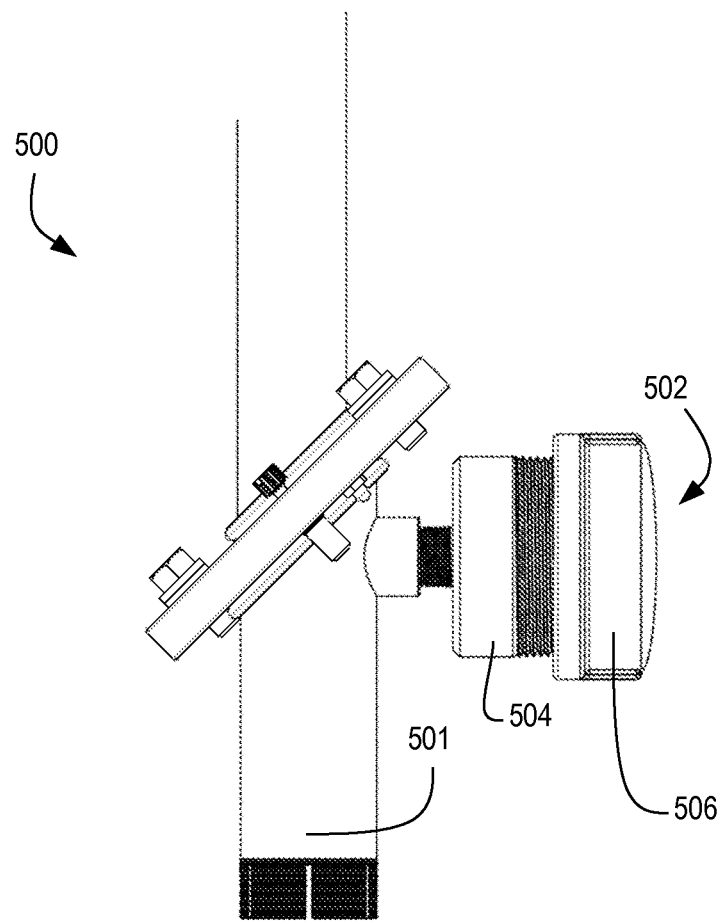
FIG. 5A illustrates a pivoting pole assembly incorporating a junction box module.
Figure 5D:
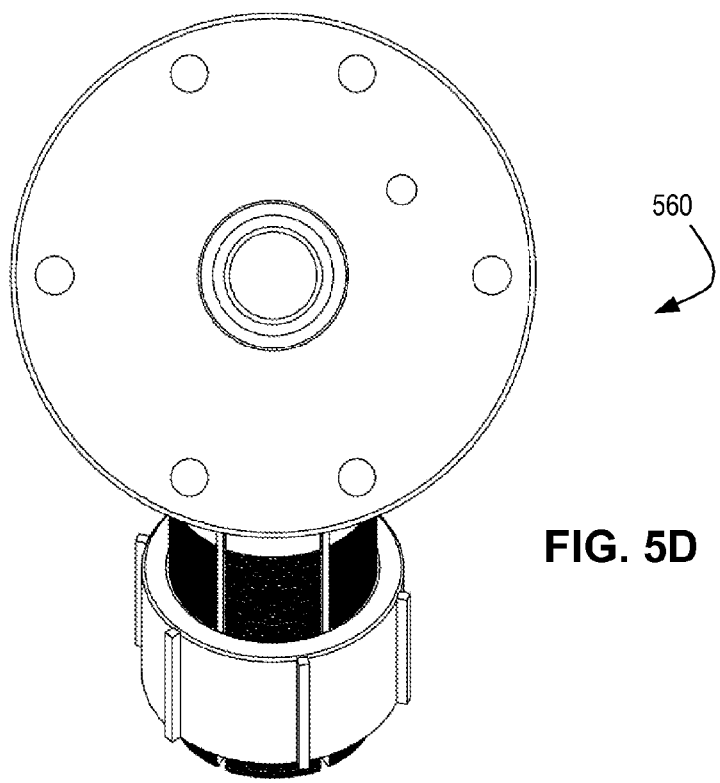
Figure 5E:
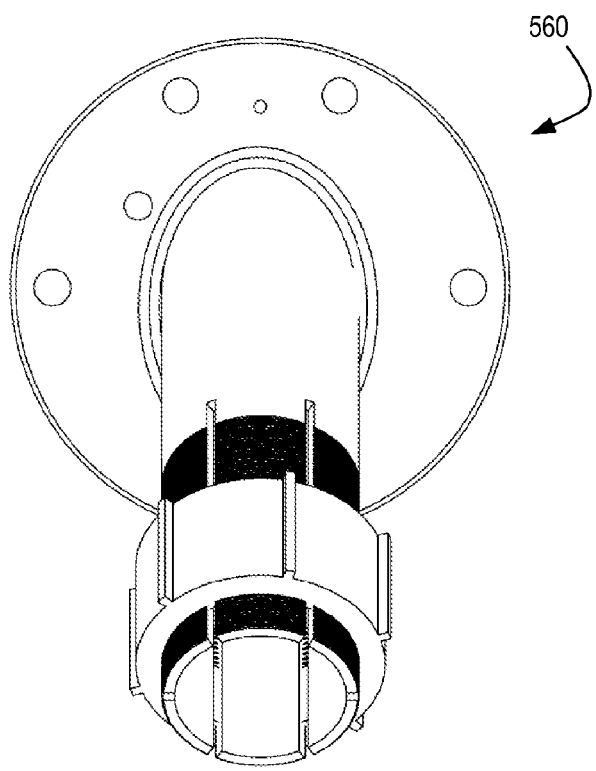

In some cases, installation may include replacing previous pole installations. In such cases, it may be possible to use all or part of the previous pole in the construction of the pivoting pole assembly. In such cases, the pole to be replaced may be wired into an existing electrical system. It is often necessary to rewire all or part of the pole. FIG. 5A illustrates a pivoting pole assembly 500 incorporating a junction box module 502. The pivoting pole assembly 500 of FIG. 5A shows a junction box module 502 incorporated into lower pole assembly 501. FIG. 5B illustrates an upper pole assembly 508 incorporating a junction box module 502. The junction box module 502 provides access to wiring running internal to the pole (or any other elongate object, depending on form factor) which may then be sealed against environment conditions. The junction box module 502 includes a compartment 504 coupled to the pole with fluid connection to the interior passage of the pole, the compartment having a sealable opening to the pole exterior. The opening may be sealable by a cap 506. The cap and the opening may be threaded for weatherproof engagement. Some junction box modules may feature rectangular or other shapes, hinged lids, or other features common to electrical systems environmentally sealed for outdoor use.

Replacing a previous pole installation may also be carried out using a conversion pivot joint including a conversion pivot joint component for first component 100. FIGS. 5A, 5C-5E illustrate a conversion pivot joint component according to embodiments of the invention. Referring to FIGS. 5A, 5C-5E, conversion pivot joint component 550 includes a mating surface extending from the outside face 110. The mating surface may be implemented as a tubular adaptor, such as, for example, lock nut assembly 560. Lock nut assembly 560 comprises a longitudinally sectioned threaded cylinder 562 and a corresponding nut 564. The pre-existing pole or sections of it may be inserted into the lock nut assembly 560 and engaged by rotating nut 564 in the appropriate direction so that it travels away from component 100 and towards the pre-existing pole section, thereby tightening threaded cylinder 562 around the pole section and locking it into place. Other implementations may instead use a conversion pivot joint component for second component 200.

Figure 6:
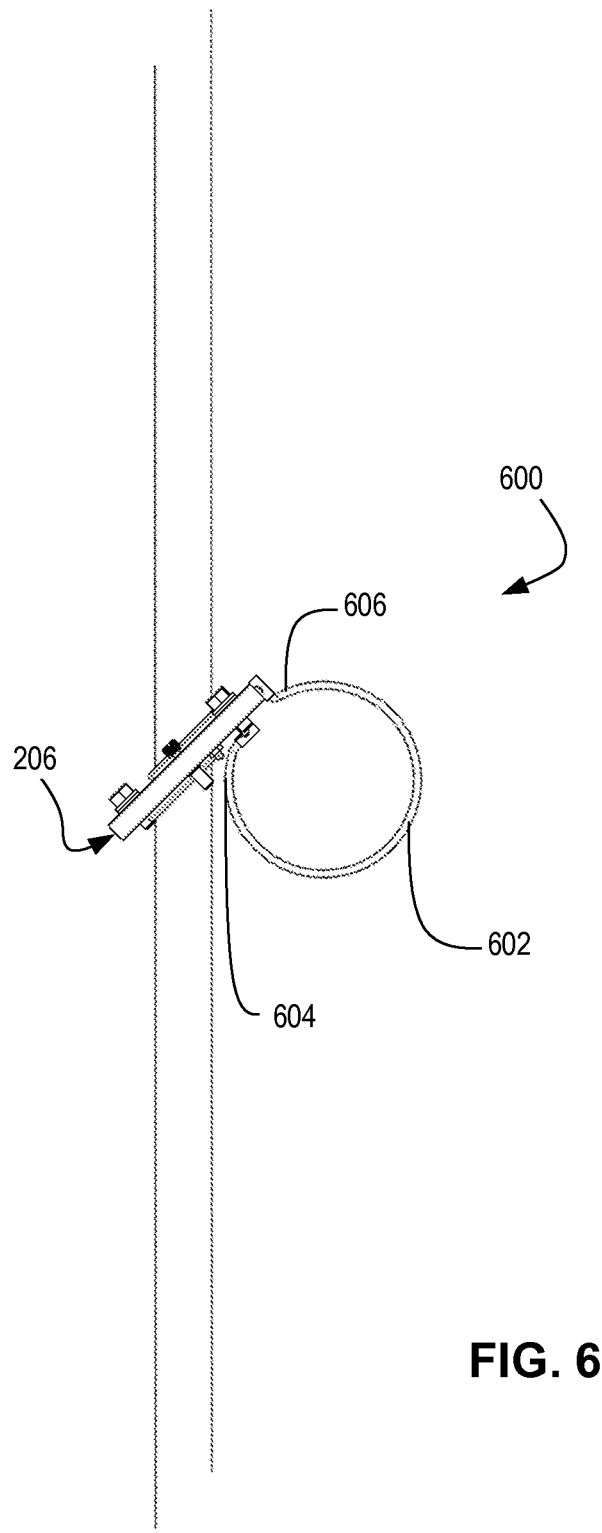
FIG. 6 illustrates a pivoting pole assembly incorporating a grounding strap 602 according to embodiments of the invention.

FIG. 6 illustrates a pivoting pole assembly 600 incorporating a grounding strap 602 according to embodiments of the invention. Grounding strap 602 may be coupled at one end 604 to a grounding socket (not shown) in the outside face 102 of the first component 100 by a grounding screw (350, FIG. 3B). The opposing end 606 of the grounding strap 602 may be coupled to a grounding socket (not shown) on the perimeter 206 of the second component 200.

The discussion above has focused primarily on embodiments of the invention for use with pivoting pole assemblies for industrial light poles. Other embodiments may be used with other types of elongate objects, or in other environments. It should be understood that the inventive concepts disclosed herein are capable of many modifications. To the extent such modifications fall within the scope of the appended claims and their equivalents, they are intended to be covered by this patent.

What is claimed is:

1. An apparatus for use in a pivoting pole assembly, the pivoting pole assembly comprising (a) an elongate object including a base element and a support element and (b) an item mounted to the support element at a remote end of the support element relative to the base element, the apparatus comprising:
a first component defining a first central wiring passage, and comprising a first outside face, the first outside face adapted for connection with at least one of the support element and the base element of the elongate object, and a first inside face; and
a second component defining a second central wiring passage, and comprising a second outside face, the second outside face adapted for connection with at least the other of a the support element and the base element of the elongate object, and a second inside face rotationally coupled to the first inside face such that the first central wiring passage and the second central wiring passage are fluidly connected; and the first component rotates with respect to the second component about a common axis of rotation;
a grounding strap electrically coupling the first component and the second component; and
an annular locking mechanism configured to hold the first component immobile with respect to the second component, wherein the annular locking mechanism comprises:
one or more arcuate channels, defined by the second component, the channels located a radial distance from the common axis of rotation and extending from the second inside face to the second outside face of the second component, each channel comprising a first channel end and a second channel end; and
one or more protrusions extending from the first component and extending into the one or more channels such that, upon rotation of the second component with respect to the first component, each of the protrusions travels along one of the one or more channels, and a range of relative rotation of the second component with respect to the first component is defined by the length of the channels.

2. The apparatus of claim 1 wherein the apparatus is configured such that, upon connection of the base element and the support element, respectively, to opposing faces chosen from the first outside face and the second outside face:
the elongate object is pivotable through a range of motion corresponding to the arcuate channels such that the remote end of the support element may be raised or lowered through rotation of the first component; and rotation of the first component and the second component with respect to one another comprises a range of possible rotation defined by the one or more first channel ends and the one or more second channel ends.

3. The apparatus of claim 2, wherein the apparatus is configured for an elongate object of a particular length attached to at least one of the first outside face and the second outside face of the apparatus at a particular angle such that upon the installation of the pivoting pole assembly with the base element of the elongate object and the support element being connected to the respective opposing faces, and the item being mounted at a particular location on the elongate object:
upon at least one protrusion abutting at least one first channel end, the elongate object is aligned in an optimal operational orientation; and
upon at least one protrusion abutting at least one second channel end, the elongate object is aligned in an optimal target orientation providing access to an item mounted on the elongate object at an optimum access elevation.

4. The apparatus of claim 1 wherein the first component and the second component each comprises a toroid.

5. The apparatus of claim 1 wherein the first component and the second component comprise interlocking flange plates.

6. The apparatus of claim 1 wherein one or more of the at least one protrusion in the first component comprises a bolt threadedly engaged with the first component.

7. The apparatus of claim 6 wherein the bolt is threadedly tightenable into the first component, and the locking mechanism comprises the bolt biasing the first component and the second component together.

8. The apparatus of claim 1 wherein the first outside face comprises a first perimeter and a first annular mating surface between the first central wiring passage and the first perimeter, the mating surface adapted for connection with a rim of a tubular object.

9. The apparatus of claim 8 wherein the mating surface is adapted for a welded connection.

10. The apparatus of claim 1 wherein the second outside face comprises a second perimeter and a second annular mating surface between the second central wiring passage and the second perimeter, the mating surface adapted for connection with a rim of a tubular object.

11. The apparatus of claim 10 wherein the mating surface is adapted for a welded connection.

12. The apparatus of claim 8 or 10, wherein the mating surface comprises a tubular adaptor in fluid connection with the first central wiring passage, the tubular adapter configured to receive an elongate object.

13. The apparatus of claim 1 further comprising a hub extending through the plane of rotation from the inside face of at least one of the first component and the second component and substantially to the plane defined by the outside face of the other of the first component and the second component.

14. The apparatus of claim 1 further comprising a collar extending through the plane of rotation from the inside face of at least one of the first component and the second component and substantially to the plane defined by the outside face of the other of the first component and the second component, and encircling the perimeter of the other of the first component and the second component.

15. The apparatus of claim 1 further comprising an elongate object having a base element coupled to the first component and a support element connected to the second component.

16. The apparatus of claim 1 further comprising an elongate object having a base element coupled to the second component and a support element connected to the first component.

17. The apparatus of claim 15 or 16 wherein the support element comprises a second elongate object.

18. The apparatus of claim 15 or 16 wherein the elongate object further comprises a junction box module.

19. An apparatus for use in a pivoting pole assembly, the pivoting pole assembly comprising (a) an elongate object including a base element and a support element and (b) an item mounted to the support element at a remote end of the support element relative to the base element, the apparatus comprising:
- a first component defining a first central wiring passage, and comprising a first outside face, the first outside face adapted for connection with at least one of the support element and the base element of the elongate object, and a first inside face;
- a second component defining a second central wiring passage, and comprising a second outside face, the second outside face adapted for connection with at least the other of a the support element and the base element of the elongate object, and a second inside face rotationally coupled to the first inside face such that the first central wiring passage and the second central wiring passage are fluidly connected; and the first component rotates with respect to the second component about a common axis of rotation;
- a junction box module; and
- an annular locking mechanism configured to hold the first component immobile with respect to the second component;
- wherein at least one of the first outside face and the second outside face comprises a perimeter and a tubular mating surface radially located between the perimeter and the outermost of the first central wiring passage and the second central wiring passage, the tubular mating surface comprising a tubular adaptor in fluid connection with at least one of the first central wiring passage and the second central wiring passage, the tubular adapter configured to receive an elongate object, and wherein the junction box module is in fluid connection with the tubular adaptor.

* * * * *